US008328908B2

(12) United States Patent
Snape et al.

(10) Patent No.: US 8,328,908 B2
(45) Date of Patent: Dec. 11, 2012

(54) SORBENT COMPOSITION

(75) Inventors: Colin Edward Snape, Nottingham (GB); Cheng-gong Sun, Nottingham (GB); Janos Lakatos, Nottingham (GB); Ron Earl Perry, Nottingham (GB)

(73) Assignee: University of Nottingham, Nottingham, Nottinghamshire (GB)

( * ) Notice: Subject to any disclaimer, the term of this patent is extended or adjusted under 35 U.S.C. 154(b) by 466 days.

(21) Appl. No.: 12/524,792

(22) PCT Filed: Jan. 29, 2008

(86) PCT No.: PCT/GB2008/050056
§ 371 (c)(1),
(2), (4) Date: Jul. 28, 2009

(87) PCT Pub. No.: WO2008/093137
PCT Pub. Date: Aug. 7, 2008

(65) Prior Publication Data
US 2010/0005963 A1    Jan. 14, 2010

(30) Foreign Application Priority Data

Jan. 29, 2007 (GB) .................................. 0701585.2
Oct. 29, 2007 (GB) .................................. 0721138.6

(51) Int. Cl.
*B01D 53/02* (2006.01)
*B01J 20/06* (2006.01)
(52) U.S. Cl. .............. 95/133; 95/134; 95/900; 423/605; 502/415
(58) Field of Classification Search ............. 95/107, 95/133, 134, 148, 900; 96/108, 134, 150; 423/210, 605; 502/400, 415, 324; 110/345, 110/203
See application file for complete search history.

(56) References Cited

U.S. PATENT DOCUMENTS

| | | | |
|---|---|---|---|
| 4,992,620 A * | 2/1991 | Nowack et al. ............... 585/823 |
| 5,283,041 A * | 2/1994 | Nguyen et al. ............. 423/240 S |
| 6,200,542 B1 | 3/2001 | Poles et al. |
| 6,383,981 B1 | 5/2002 | Blankenship et al. |
| 7,060,233 B1 * | 6/2006 | Srinivas et al. ................ 423/210 |
| 7,585,359 B2 * | 9/2009 | Withiam et al. ................ 96/153 |
| 2003/0126989 A1 * | 7/2003 | Bancon et al. ..................... 95/96 |
| 2003/0157008 A1 | 8/2003 | Pahlman et al. |
| 2004/0258609 A1 * | 12/2004 | Boren et al. .................. 423/605 |

OTHER PUBLICATIONS

Dunham et al., "Fixed-Bed Studies of the Interactions Between Mercury and Coal Combustion Fly Ash," Fuel Process. Technol. 82:197-213 (2003).
Eguchi et al., Reversible Sorption-Desorption of NOx by Mixed Oxides Under Various Atmospheres, Catalyst Today 45:109-115 (1998).
Granite et al., "Novel Sorbents for Mercury Removal from Flue Gas," Ind. Eng. Chem. Res. 39:1020-1029 (2000).
Huggins et al., "XAFS Characterization of Mercury Captured From Combustion Gases on Sorbents at Low Temperatures," Fuel Proc. Technol. 82:167-196 (2002).
Keating et al., "Mercury Study Report to Congress, vol. II: An Inventory of Anthropogenic Mercury Emissions in the United States," U.S. Environmental Protection Agency, Office of Air Quality Planning & Standards (1997).
Lopez-Anton et al., "Retention of Mercury in Activated Carbons in Coal Combustion and Gasification Flue Gas," Fuel Proc. Technol. 77-78:353-358 (2002).
Olson et al., "Catalytic Effect of Carbon Sorbents for Mercury Capture," J. Hazardous Materials 74:61-69 (2000).
Pavlish et al., "Status Review of Mercury Control Options for Coal-Fired Power Plants," Fuel Proc. Technol. 82:89-165 (2003).

* cited by examiner

*Primary Examiner* — Frank Lawrence, Jr.
(74) *Attorney, Agent, or Firm* — LeClairRyan, a Professional Corporation

(57) ABSTRACT

The invention provides an apparatus and methods for removing heavy metals and heavy metal-containing compounds from fluid streams. The invention also provides new uses and methods for removing heavy metals and heavy metal-containing compounds from a natural gas stream, or a gas stream produced during the combustion or gasification of a fossil fuel, such as coal or petroleum fuels or oil.

52 Claims, 6 Drawing Sheets

Figure: 1
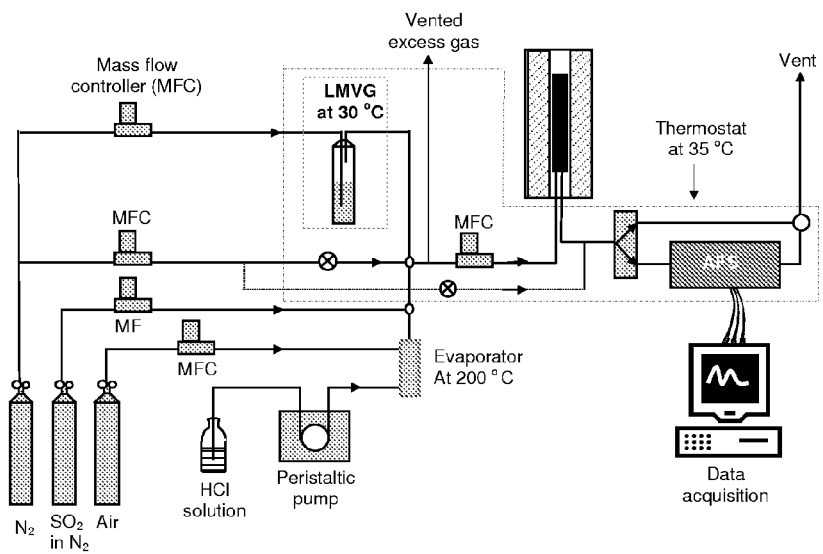
Figure: 2
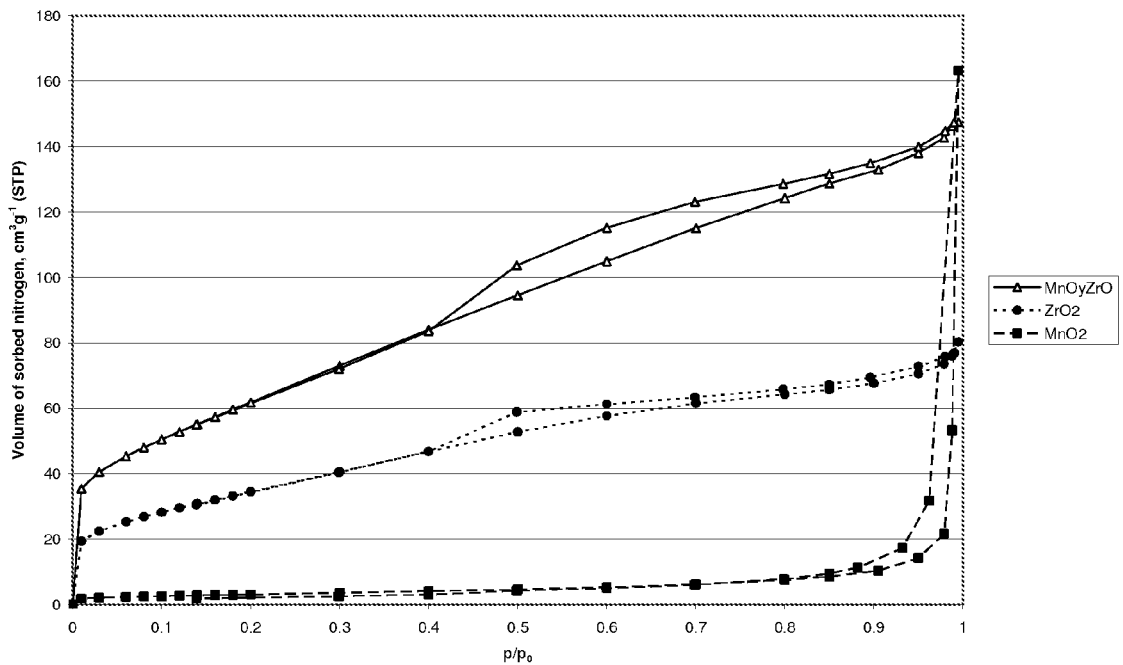

Figure: 3
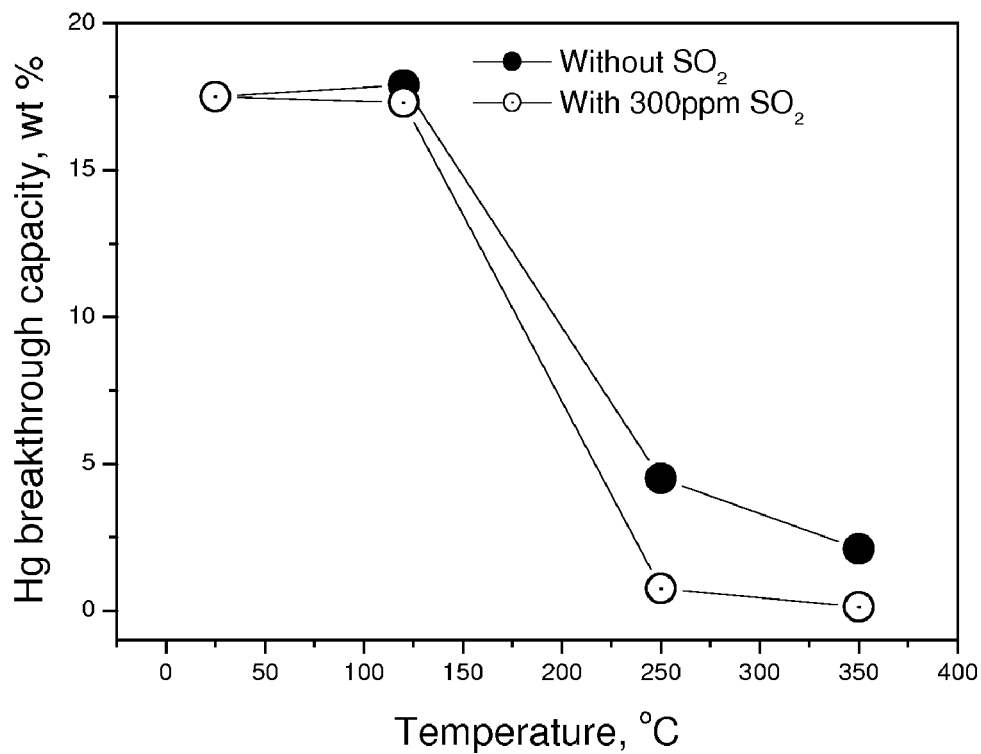
Figure: 4
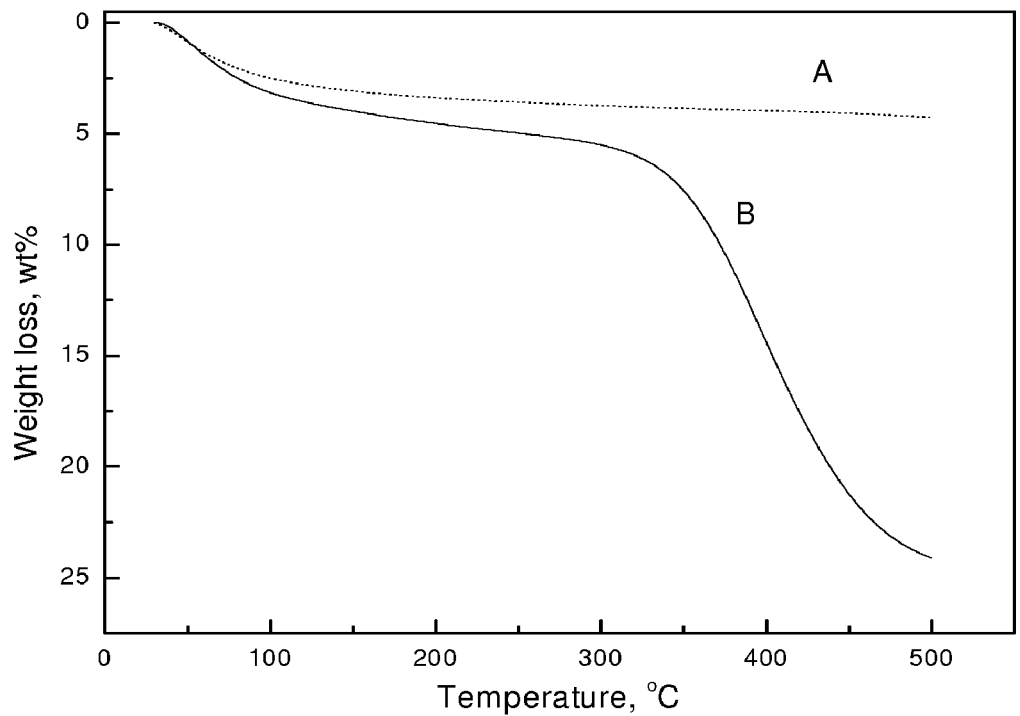

Figure: 5
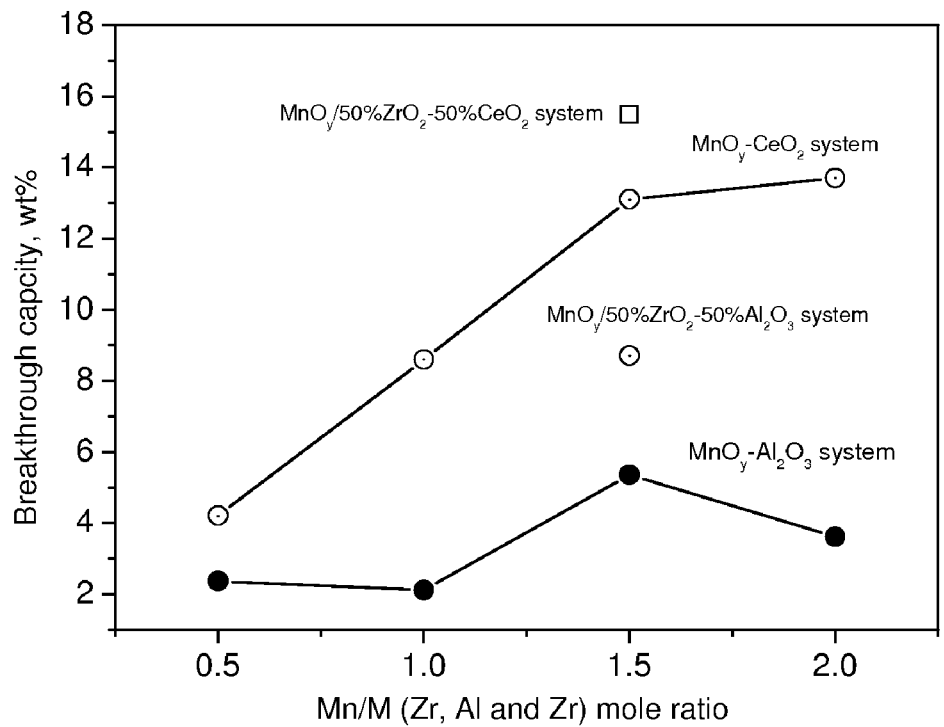
Figure: 6
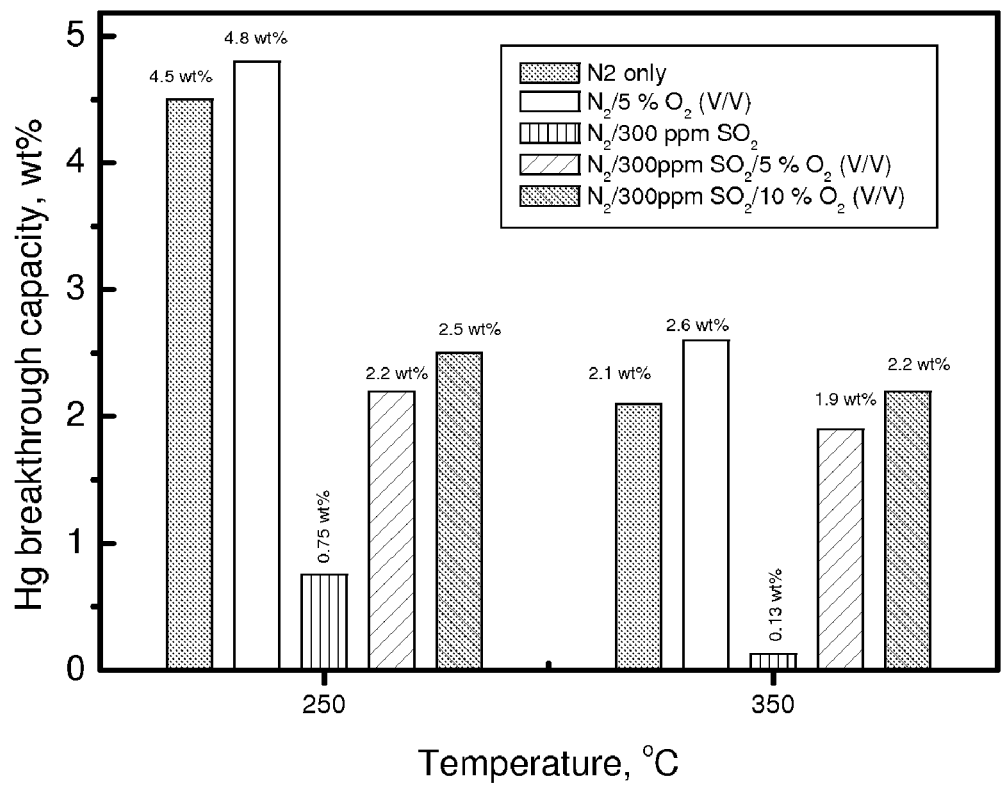

Figure: 7
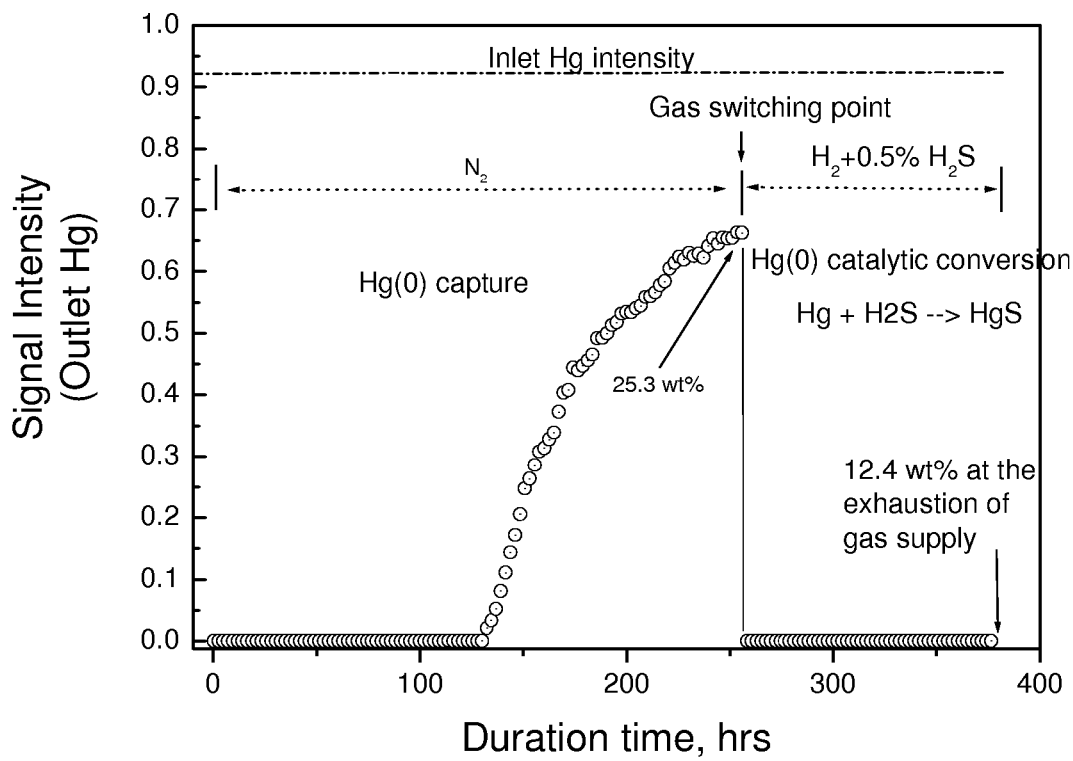
Figure: 8
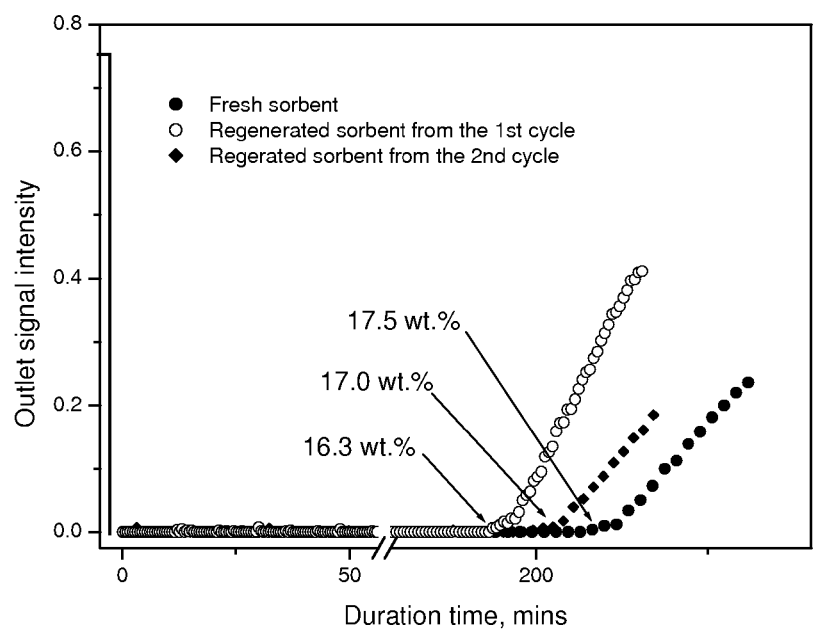

Figure: 9
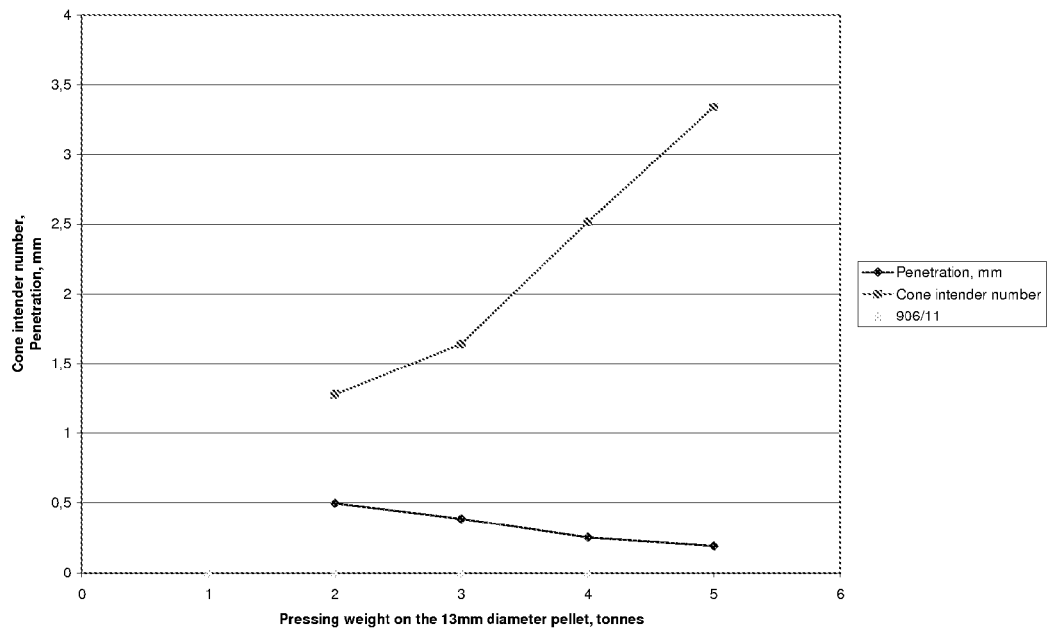
Figure: 10
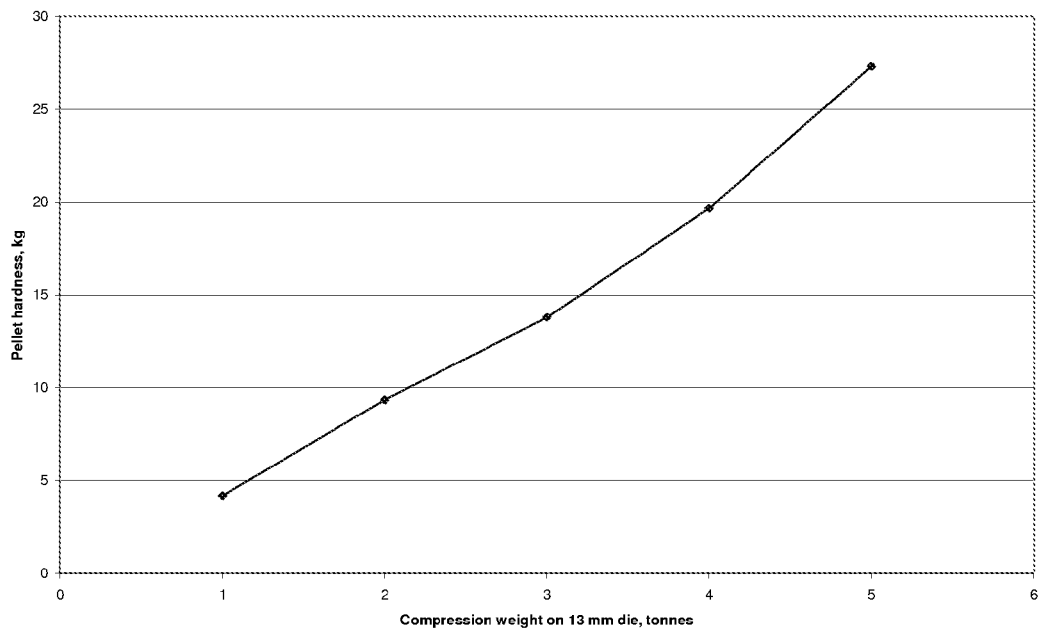

Figure: 11
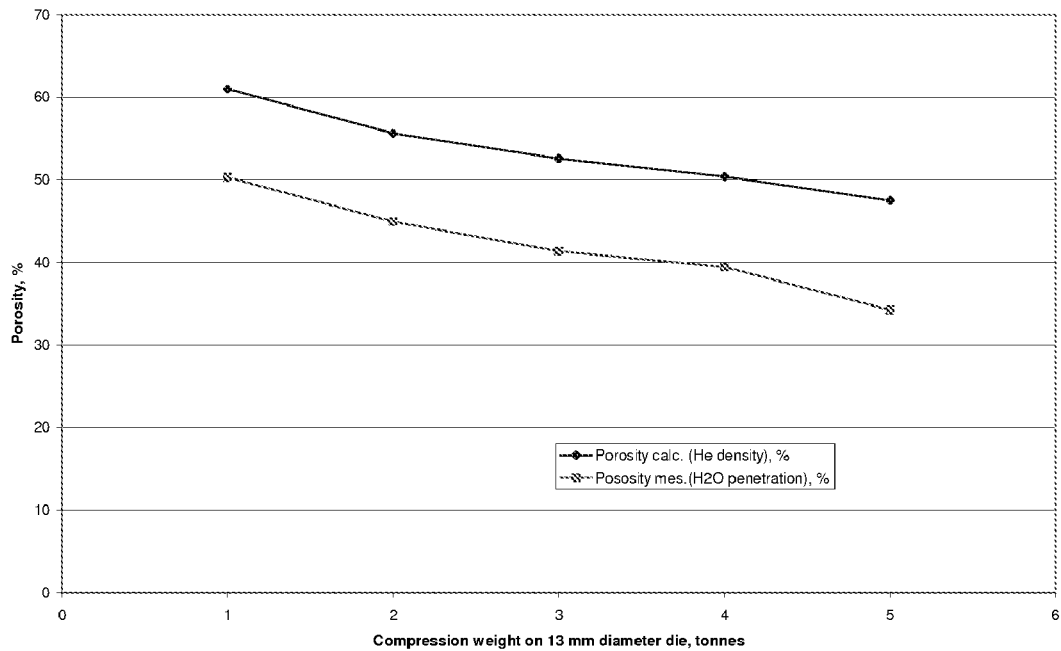
Figure: 12
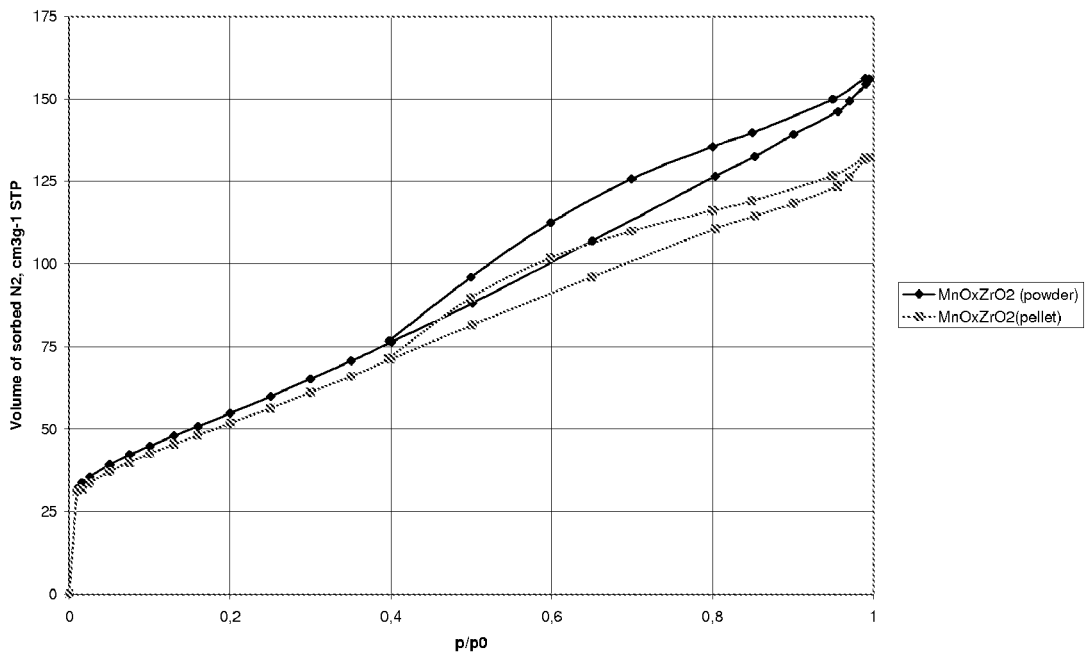

SORBENT COMPOSITION

The present invention relates to sorbent compositions, and to methods of using sorbent compositions for removing heavy metals and heavy metal-containing compounds from fluid streams. The invention also extends to an apparatus for removing heavy metals and heavy metal-containing compounds from fluid streams.

Heavy metals are released during the combustion of many fossil fuels and/or waste materials. These heavy metals include mercury, arsenic, beryllium, lead, cadmium, chromium, nickel, zinc, and barium, most of which are toxic to humans. In particular, elemental arsenic and mercury compounds, and compounds containing these metals, such as mercury chlorides, are thought to compromise the health and mental acuity of children. Therefore, there is every indication that the amount of these heavy metals, which are currently legally allowed to be released during the combustion of fossil fuels and/or waste materials, including coal burning power plants and petroleum refineries, will be reduced by future legislation. For example, mercury emissions from coal combustion and waste incineration have been of great environmental concern and are targeted under the UK Clean Air Act Amendments of 1990.

Mercury speciation is an important factor in removal strategies since it can exist in both elemental form, ie Hg(0), and oxidised forms, ie Hg(I), Hg(II). In flue gases, oxidised forms of mercury, such as $HgCl_2$ and $HgO$, can dominate, particularly for bituminous and high chlorine coals, and where selective catalytic reduction (SCR) is employed. In contrast, predominantly Hg(0) is believed to exist in coal gasification streams.

A wide range of different adsorbents for removing mercury from gas streams have been investigated, including activated carbons, zeolites (physical/chemical adsorption), calcium species (chemical reaction), transition metals (amalgamation) and their oxides/sulfides (chemical adsorption/reaction). In order to improve the efficiencies of activated carbons for the removal of mercury, investigations have been conducted to achieve efficient surface modifications via sulphur and halogen (bromine and iodine) impregnation, which are believed to enhance the sorption of elemental mercury. Other investigations have shown that elemental mercury is adsorbed in oxidised forms, and that the removal efficiency can be improved considerably if mercury is oxidised before or during adsorption. A problem with activated carbons is that they are deactivated by sulphur dioxide, and so require frequent replacement.

Granite et. al. (Ind. Eng. Chem. Res. 2000, 39, 1020-1029) compared a number of different sorbents for capturing mercury, including manganese oxide supported on alumina ($Al_2O_3$), or chroma ($Cr_2O_3$), or metal sulfides, eg molybdenum sulfide ($MoS_2$). However, they found that each of these sorbents exhibited only modest capacities for mercury capture. US2003157008 discloses the use of pure manganese oxides for the removal of mercury compounds. However, it is demonstrated by example that this type of system also exhibits poor rates of mercury capture.

Hence, while a variety of adsorbents are available for the capture of heavy metals (in particular mercury), these adsorbents tend to have low capacities for the heavy metal, and suffer the problem that they are easily deactivated by other components in the gas stream being treated, such as sulphur oxides. Thus, there exists a need for an improved sorbent material that removes heavy metals, such as mercury, from gas streams, which has a high capacity for retaining mercury as a non-volatile compound, and which does not require frequent reactivation.

It is therefore an object of the present invention to obviate or mitigate one or more of the problems of the prior art, whether identified herein or elsewhere, and to provide improved sorbent compositions capable of adsorbing high concentrations of heavy metals (such as mercury or arsenic) from fluid streams before requiring replacement and/or reactivation.

The inventors investigated the use of catalytic sorbent compositions comprising manganese oxide combined with a suitable support material for mercury sorption/capture from fluid streams. In order to make manganese oxide as effective as possible for heavy metal capture from a fluid stream, the inventors believed that it would be beneficial to increase the surface area of the sorption composition by co-precipitation with the support material. The inventors found that when manganese oxide was co-precipitated with the support material (such as zirconia), there was a significant increase in its surface area and porosity, which resulted in an unexpectedly high capacity for mercury capture. The inventors believe that the novel application for the sorbent composition could be applied to the capture of any heavy metal or heavy metal-containing compound from a fluid stream.

Hence, according to a first aspect of the invention, there is provided use of a sorbent composition comprising manganese oxide co-precipitated with a support material, for removing a heavy metal or a heavy metal-containing compound from a fluid.

According to a second aspect of the invention, there is provided a method of removing a heavy metal or a heavy metal-containing compound from a fluid, the method comprising contacting a fluid containing a heavy metal or heavy metal-containing compound, with a sorbent composition comprising manganese oxide co-precipitated with a support material, under conditions suitable to remove the heavy metal or heavy metal-containing compound from the fluid.

According to a third aspect of the invention, there is provided a heavy metal removal apparatus for removing a heavy metal or a heavy metal-containing compound from a fluid, the apparatus comprising a sorbent composition comprising manganese oxide co-precipitated with a support material, and means for contacting the sorbent composition with a fluid containing a heavy metal or a heavy metal-containing compound, wherein the sorbent composition is capable, in use, of removing the heavy metal or heavy metal-containing compound from the fluid.

By the term "sorbent composition", we mean a material that takes up, or sorbs, another substance (ie the heavy metal or heavy metal-containing compound) by either absorption or adsorption.

By the term "co-precipitated", we mean that the sorbent composition is prepared by simultaneously precipitating the manganese oxide and the support material together. Such co-precipitation methods will be commonly known to the skilled technician, examples of which are described in U.S. Pat. No. 6,200,542 and U.S. Pat. No. 5,283,041.

The extent to which the sorbent composition is able to capture the heavy metal or heavy metal-containing compound from a fluid can be quantified in terms of its breakthrough capacity. The breakthrough capacity is the quantity of the heavy metal captured on the sorbent composition, expressed as a percentage (w/w) of the sorbent composition, before appreciable quantities of the heavy metal pass through the sorbent composition without being captured. As described in Example 2 and with reference to Table:1, using manganese oxide co-precipitated with zirconia ($ZnO_2$) as the support material, resulted in exceedingly high mercury breakthrough capacities of over 22.6% (w/w) mercury when the sorbent composition was tested in pure form, and over 17.5% (w/w) mercury when diluted with sand at a sorbent:sand ratio of 1:3 (v/v). This is in comparison to as little as only 2% (w/w) mercury for pure, precipitated manganese oxides (ie in the absence of a co-precipitated support material), and only about 0.06% (w/w) mercury for a commercially-available activated carbon (AC), which has been widely used in direct injection trials for removing mercury from flue gases derived from pulverised fuel (PF) combustion. The breakthrough capacity of 22.6% (w/w) mercury when used in undiluted form is over 375 times higher than that for commercial activated carbon. The breakthrough capacity of 17.5% (w/w) mercury when diluted with sand is about 300 times higher than that for commercial activated carbon. Accordingly, manganese oxide, when co-precipitated onto a suitable support material, such as zirconia, in such a way as to significantly increase the surface area of the resultant composition, results in a surprisingly high capacity for capturing heavy metals (eg mercury) from a fluid.

Although the inventors do not wish to be bound by any hypothesis, they believe that Hg(0) is oxidised to Hg(II), which is the captured form. Furthermore, as shown in the examples, variable temperature measurements indicate that the capacity of the sorbent composition for mercury remains surprisingly high to temperatures above about 150° C. The inventors believe that this suggests that strong chemical, in addition to physical, adsorption occurs, such that the sorbent composition will have significant utility for removing heavy metals from the majority of fluid streams. In addition, the inventors have surprisingly found that sulphur dioxide ($SO_2$) does not impair the performance of the sorbent composition until temperatures above 150° C. Hence, the activity of the sorbent composition is retained even when used to remove heavy metals and heavy metal-containing compounds from fluid streams having high concentrations of sulphur dioxide, a problem often encountered when using traditional catalysts, such as activated carbon. The inventors therefore believe that the manganese oxide-based sorbent composition will be highly effective at removing heavy metals from flue gas streams, for example a natural gas stream.

By the term "heavy metal", we mean any of the higher atomic weight elements, which have the properties of a metallic substance at STP.

The heavy metal or heavy metal-containing compound that is removed from the fluid by the sorbent composition may be selected from a group of heavy metals consisting of arsenic, beryllium, lead, cadmium, chromium, nickel, zinc, mercury, and barium. However, the inventors believe that mercury (Hg) and arsenic (As) are more commonly removed from the fluid because most other heavy metals are generally involatile in the optimum temperature ranges used for the sorbent composition. Therefore, preferably the heavy metal that is removed from the fluid is mercury (Hg) or arsenic (As). Preferably, the heavy metal-containing compounds that are removed from the fluid contain mercury or arsenic. Most preferably however the heavy metal is mercury.

The sorbent composition may comprise manganese (III) oxide and/or manganese (IV) oxide. The manganese oxide component of the sorbent composition is highly amorphous when co-precipitated with supports, but X-ray diffraction has revealed that manganese (III) oxide (ie $Mn_2O_3$) is the dominant form present. Hence, preferably the sorbent composition comprises a substantial portion of manganese (III) oxide, ie preferably at least 90% (w/w) manganese (III) oxide, more preferably at least 95% (w/w) manganese (III) oxide, and most preferably at least 99% (w/w) manganese (III) oxide.

Preferably, the support material comprises a metal-containing compound that has high temperature stability. For example, the support material may comprise a refractory metal-containing compound. The support material preferably comprises a metal oxide. The support material may be selected from a group of support materials consisting of ceria ($CeO_2$), alumina ($Al_2O_3$), titania ($TiO_2$), silica ($SiO_2$), chromia ($CrO_2$), and zirconia ($ZrO_2$), and mixtures thereof. Preferably, the support material is co-precipitated with the manganese oxide during preparation of the sorbent composition.

A preferred support material co-precipitated with the manganese oxide is zirconia ($ZrO_2$). Thus, preferably the sorbent composition comprises manganese oxide co-precipitated with or on zirconia (referred to herein as $MnO_x/ZrO_2$). The inventors have found that such sorbent compositions are ideally suited for capturing heavy metals from fluid streams. Accordingly, it is most preferred that the use according to the first aspect, or the method according to the second aspect, or the apparatus according to the third aspect, comprises use of a sorbent composition which comprises manganese oxide co-precipitated with or on a zirconia support material for removing a heavy metal or a heavy metal-containing compound from a fluid, such as a natural gas stream.

It is preferred that the sorbent composition comprises one support material. However, as described in Example 3, the sorbent composition may comprise manganese oxide co-precipitated with a mixture of different support materials, for example, mixtures of at least two, three, four or five different support materials. For example, suitable mixtures of co-precipitated support materials may comprise ceria ($CeO_2$) combined with zirconia ($ZrO_2$), which is referred to herein as $MnO_x/ZrO_2$—$CeO_2$, or zirconia ($ZrO_2$) combined with alumina ($Al_2O_3$), which is referred to herein as $MnO_x/ZrO_2$—$Al_2O_3$, or titania ($TiO_2$) combined with silica ($SiO_2$) or chromia ($CrO_2$), which are referred to herein as $MnO_x/TiO_2$—$SiO_2$ and $MnO_x/TiO_2$—$CrO_2$, and so on. Surprisingly, the inventors have found that $MnO_x/ZrO_2$—$CeO_2$ has a breakthrough capacity of 15.5% (w/w) mercury.

Where the sorbent composition comprises more than one support material combined together, the molar ratio of combined support materials (eg $CeO_2:ZrO_2$, or $ZrO_2:Al_2O_3$) may be between about 1:99 and 99:1, preferably between about 20:80 and 80:20, more preferably between about 35:65 and 65:35, and most preferably about 50:50.

It will be appreciated that the sorbent composition used in accordance with the use of the first aspect, or the method of the second aspect, or the apparatus of the third aspect, is prepared using a co-precipitation technique, which will be known to the skilled technician. The sorbent composition used in accordance with the invention comprises manganese oxide co-precipitated with any one of a number of suitable support materials, such as ceria, alumina, titania, silica, or chromia, or mixtures thereof. However, preferably the sorbent composition comprises manganese oxide co-precipitated with zirconia. U.S. Pat. No. 6,200,542 describes a suitable method for preparing a co-precipitate of a manganese oxide and zirconia. However, the same methodology may be applied when making co-precipitates of manganese oxide with other suitable support materials.

Preferably, the sorbent composition is prepared by co-precipitation of a manganese-containing compound and a zirconium-containing compound. It is preferred that the manganese-containing compound is a manganese oxide precursor, and that the zirconium-containing compound is a zirconium oxide precursor. Examples of a suitable manganese oxide precursor include manganese nitrate, manganese acetate, manganese dichloride or manganese dibromide. A preferred manganese oxide precursor is manganese nitrate. Examples of suitable zirconium oxide precursors include zirconium nitrate, zirconium acetate, zirconium oxychloride, or zirconium oxysulfate. A preferred zirconium oxide precursor is zirconium nitrate.

Preferably, aqueous solutions of the two precursor compounds are prepared, and then mixed together. A sufficient amount of a base, such as ammonium hydroxide, may be added to the mixture in order to obtain a pH of about 8-10 (preferably, about 9), which results in a co-precipitate forming. The co-precipitate may be filtered, and optionally washed (eg with water) prior to drying. The co-precipitate may be dried at about 400° C. to 500° C. for a suitable period of time, eg at least 2 hours, preferably at least 4 hours. The co-precipitate may then be ground down to the desired particle size, and then filtered, if necessary.

Preferably, the sorbent composition comprises between about 10 and 80% (w/w) manganese oxide, more preferably between about 20 and 50% (w/w) manganese oxide, and most preferably between about 35 and 45% (w/w) manganese oxide. Preferably, the sorbent composition comprises between about 20 and 90% (w/w) support material, more preferably between about 50 and 80% (w/w) support material, and most preferably between about 55 and 65% (w/w) support material.

Preferably, the co-precipitated sorbent composition comprises from about 5:95 to 95:5 (w/w) in a ratio based on the weight of manganese oxide and support material, more preferably from about 10:90 to 75:25, even more preferably from about 10:90 to 50:50; and most preferably from 15:85 to 50:50, manganese oxide to support material (w/w).

Preferably, the atomic ratio of manganese to metal atoms in the support material is between about 1:99 and 99:1, more preferably between about 20:80 and 80:20, even more preferably between about 35:65 and 65:35, and most preferably about 50:50. The inventors have found that an atomic ratio of 1:1 provides a high surface area for the sorbent composition, and achieves a surprisingly high mercury breakthrough capacity.

The surface area of the sorbent composition used in accordance with the invention is closely determined by the proportion of support material (eg zirconia) formed during the co-precipitation step from its precursor (eg zirconyl nitrate), which is used as the structuring material for the sorbent composition. The surface area of the sorbent composition may be at least 70 $m^2/g$. However, it is preferred that the sorbent composition has a surface area of at least 100 $m^2/g$, more preferably at least 150 $m^2/g$, even more preferably at least 200 $m^2/g$, and most preferably at least 220 $m^2/g$. The surface area can be measured by the (Brunauer, Emmett, and Teller) "BET method" as described by Kantro, D. L., Brunauer, S., and Copeland, L. E. in "BET Surface Areas: Methods and Interpretations" in The Solid-Gas Interface, Vol. 1 (E. A. Flood, Ed.), Marcel Dekker, New York, 1967.

Preferably, the sorbent composition has a pore volume which is greater than 0.5 $cm^3/g$, typically ranging from 0.5 to 4.0 $cm^3/g$, and preferably about from 1 to 2 $cm^3/g$. Preferably, the sorbent composition has a porosity which is greater than 30%, more preferably greater than 40%, even more preferably greater than 50%, and most preferably greater than 60%. The porosity may be measured by mercury porosimetry, as described in Sol-Gel Materials: Chemistry and Applications (John Dalton Wright, Nico A. J. M., Maria Sommerdijk (Ed.), P. 74, CRC Press 2001).

It will be appreciated that, once prepared, the sorbent composition may be used in any configuration, shape or size for contacting with the fluid containing the heavy metal or heavy metal-containing compound. For example, the sorbent composition may be employed in particulate form, or combined with an inert solid (monolithic) carrier to produce what is referred to in the art as a monolithic structure.

The particulate form of sorbent composition may be desirable in embodiments of the invention where large volumes of sorbent composition are needed, and for use in circumstances in which frequent replacement of the sorbent composition may be required. Preferably, the sorbent composition comprises finely divided particles, which may be contacted with the fluid during the contacting step of the method according to the second aspect.

The mean particle size of the sorbent composition may be between about 1 μm and 20 mm, preferably between about 10 μm and 10 mm, more preferably between about 30 μm and 5 mm, more preferably between about 50 μm and 1 mm, even more preferably between about 75 μm and 700 μm, and most preferably between about 100 μm and 400 μm.

In some embodiments where a particulate form of sorbent composition is required, the composition may be a loose powder. In other embodiments, the sorbent composition may be formed into any shape, for example by moulding and/or the application of pressure thereto. For example, the composition may be formed into a tablet, pellet, granule, ring, or sphere, etc.

The pellet-form of sorbent composition is particularly preferred in many industrial applications. Where a pellet or sphere of sorbent composition is required, the composition may be rolled in a disk-pelletizing apparatus. Example 6 describes the characteristics of pellets formed with the sorbent composition of the invention. The sorbent composition may comprise a binder material so that the composition retains its shape, eg a pellet or sphere or ring etc. The amount of binder in the sorbent composition can vary considerably, but may be in the range of about 10 to 30% (w/w). The binder may be inorganic and capable of increasing the strength and macroporous structure of the particle. A suitable binder may be clay or bentonite.

The inventors have found that the powder form of sorbent composition is the most efficient at capturing heavy metals from a fluid, possibly due to it having a smaller mean particle size. However, as shown in FIG. 12, the inventors have surprisingly found that larger particle sizes of the sorbent composition (eg a 2 mm diameter pellet) exhibit only a minimal decrease in performance for capturing heavy metals compared to the powder form. While the inventors do not wish to be bound by any hypothesis, they believe that the pellet-form of the sorbent composition is mesoporous, and has pores (between about 2-50 nm) that are able to efficiently capture heavy metals, such as mercury, from a fluid.

A monolithic form of the sorbent composition may be preferred in circumstances in which (i) less mass of the sorbent composition is desirable, or (ii) when movement or agitation of particles of the sorbent composition would otherwise result in attrition, or dusting, or loss of dispersed metals or oxides, or (iii) when there is the risk that a significant decrease in pressure could occur across the particles due to high fluid flow rates during heavy metal capture. In the employment of the monolithic form of sorbent composition, it is preferred that the sorbent composition is applied as a thin film or coating on an inert carrier, which provides structural support for the composition. The inert carrier may be any refractory material able to withstand high temperatures, such as ceramic, or metallic materials. It is preferred that the carrier is unreactive with the catalytic components of the sorbent composition and is not degraded by the fluid stream to which it is exposed during the contacting step. Examples of suitable ceramic materials which may be used as a carrier include sillimanite, petalite, cordierite, mullite, zircon, zircon mullite, spodumene, and alumina-titanate, etc. Additionally, metallic materials which may be used as a carrier include metals and alloys which are oxidation-resistant, and which are otherwise capable of withstanding high temperatures.

The monolithic form of the sorbent composition may comprise a plurality of pores or channels extending therethrough. Accordingly, the sorbent composition may adopt a honeycomb configuration. In use, the monolithic form may be arranged such that the pores or channels extend in a direction which is substantially parallel with the direction of flow of the fluid being treated. Advantageously, the honeycomb structure can be used in either unitary form, or as an arrangement of multiple modules, any or all of which may be replaceable.

Where a monolithic form is used, the sorbent composition may be deposited on to the inert carrier by conventional means. A solution of sorbent composition may be prepared, for example by dispersing an appropriate amount of the sorbent composition in water to form a suspension. The resultant suspension may then be ball-milled for about 8 to 18 hours to form a useable slurry of the sorbent composition. Other types of mills, such as impact mills, may be used to reduce the milling time to about 1 to 4 hours. The slurry may then be used to deposit a thin film or coating of the sorbent composition onto the (monolithic) inert carrier. Optionally, the slurry may comprise an adhesion aid which is capable of increasing adhesion of the sorbent composition to the inert carrier. Suitable adhesion aids may include alumina, silica, zirconium silicate, aluminium silicate or zirconium acetate. Alternatively, the method may comprise dipping the monolithic inert carrier into the slurry, removing any excess slurry, drying, and then calcining in air at a temperature of about 450° C. to about 600° C. for about 1 to about 4 hours. This procedure may be repeated until the desired amount of sorbent composition is deposited on the carrier. It is desirable that the sorbent composition is present on the carrier in the range of about 1 to 4 g of sorbent composition per cm$^3$ of carrier volume, and preferably from about 1.5 to 3 g/cm$^3$.

Prior to use, the sorbent composition may be positioned in a fluidized bed, placed in a packed bed column, formed into monoliths, or incorporated into a honeycombed structure. When honeycombed structures are used, the pressure of the fluid being treated may decrease, in which case the method of the invention may require the use of fans or other equipment to increase the pressure of the fluid stream.

In a further embodiment, the sorbent composition may be used to coat a bag filter through which the fluid may be passed. Coating may be achieved via direct injection of the bag filter with the sorbent composition. The fluid being treated may then be passed through the bag filter to result in the sorption of the heavy metal or heavy metal-containing compound. It is envisaged that relatively small particle sizes of the sorbent composition would be utilised such that they could then be separated from any fly ash that may be collected during use.

In a further embodiment, the sorbent composition may be used in combination with, or incorporated in, a selective catalytic reduction (SCR) catalyst. It will be appreciated that an SCR catalyst is used to convert nitrogen oxides into diatomic nitrogen and water. The inventors believe that this system may be used to capture a high proportion of the heavy metal from the fluid, and would result in heavy metals, such as mercury, being retained at temperatures in excess of 350° C.

Furthermore, the mercury may be desorbed from the sorbent composition at 500° C. in order to regenerate the $MnO_x$ components present in the SCR catalyst.

The inventors believe that heavy metals may be efficiently removed from a range of fluid streams containing heavy metals or heavy metal-containing compounds. The fluid being treated may be a liquid. However, it is preferred that the fluid containing the heavy metal or heavy metal-containing compound comprises a gas stream, and preferably a flue gas stream. Flue gas generally comprises nitrogen gas. Hence, the fluid to be treated may comprise at least about 10% (v/v) nitrogen, more preferably at least about 50% (v/v) nitrogen, and most preferably between about 75 to 90% (v/v) nitrogen. The fluid may comprise between about 2.5% and 10% (v/v) oxygen, and preferably between about 3% and 7% (v/v) oxygen. The fluid may comprise between about 1% and 5% (v/v) carbon dioxide, and preferably between about 2% and 4% (v/v) carbon dioxide. The fluid may comprise between about 5% and 20% (v/v) water, and preferably between about 7% and 15% (v/v) water. The fluid may comprise between about 0% and 99% (v/v) hydrogen, and preferably between about 0% and 50% (v/v) hydrogen.

Flue gas generally comprises less than about 10% (w/w) of uncombusted hydrocarbons. Hence, it is preferred that the fluid to be treated comprises less than about 10% (w/w) uncombusted hydrocarbons, more preferably less than about 5% (w/w) uncombusted hydrocarbons, and most preferably less than about 1% (w/w) uncombusted hydrocarbons.

The inventors believe that the presence of high levels of $NO_x$ and $SO_x$ compounds in the fluid to be treated may ultimately lead to fouling of the sorbent composition, and hence, loss of activity. Hence, in preferred embodiments, the method may comprise a step of initially treating the fluid by removing $NO_x$ and $SO_x$ prior to removal of any heavy metals. However, surprisingly Example 4 demonstrates that the sorbent composition is tolerant of a range of different atmospheres in which the rate of heavy metal absorption is not significantly reduced. In Example 4, nitrogen and air containing high concentrations of sulphur dioxide were used in order to simulate actual flue gas with up to 1000 ppm $SO_2$ present. The data clearly demonstrate that the efficiency of the sorbent composition is not adversely affected by high $SO_2$ concentrations, and this is a significant advantage of the sorbent composition according to the invention.

Nevertheless, the fluid being treated preferably comprises less than about 1000 ppm of $SO_x$ compounds (such as $SO_2$), more preferably less than about 500 ppm $SO_x$, and most preferably less than about 400 ppm $SO_x$. The fluid may comprise less than about 0.5%, preferably less than 0.2% (v/v) sulphur dioxide, and more preferably less than 0.1% (v/v) sulphur dioxide. Preferably, the fluid being treated comprises less than about 400 ppm $NO_x$ (such as NO and $NO_2$), more preferably less than about 250 ppm $NO_x$, and most preferably less than about 150 ppm $NO_x$.

The fluid which may be treated may be a natural gas stream (eg methane), or a gas stream produced during the combustion or gasification of a fossil fuel, such as coal or petroleum fuels or oil. Such fluid streams are often contaminated with at least one heavy metal or compound containing a heavy metal selected from the group consisting of arsenic, beryllium, lead, cadmium, chromium, nickel, zinc, mercury, and barium. As described herein, it is desirable to remove mercury and arsenic from such fluids.

Hence, in preferred embodiments of the invention, the use of the first aspect or the method of the second aspect comprise removing mercury and/or arsenic or a compound containing mercury and/or arsenic from a gas stream, and comprise contacting the gas stream with a sorbent composition comprising manganese oxide co-precipitated with or on a support material under conditions suitable to remove mercury and/or arsenic or a compound containing mercury and/or arsenic from the gas stream. It is most preferred that the support material comprises zirconia. The gas stream which is treated may be produced during the combustion or gasification of a fossil fuel.

The commercial deployment of the co-precipitated manganese oxide-based sorbent composition in combustion and gasification processes, and for cleaning natural gas, is summarised herein with reference to the examples. For combustion processes, a combination of selective catalytic reduction (SCR) and flue gas desulphurisation (FGD) can achieve mercury capture levels of about 70% for bituminous coals. Hence, the deployment of high-capacity sorbent compositions in the use, method and apparatus according to the invention may be carried out in instances where SCR/FGD may not be employed, and when legislation and associated emissions trading dictates that close to 100% removal is required.

It will be appreciated that the various embodiments of the sorbent composition described herein can achieve high levels of heavy metal capture from the fluid. Furthermore, the inventors have found that each embodiment of the sorbent composition may be regenerated by recovering desorbed mercury from the sorbent, thereby enabling re-use of the sorbent. Hence, preferably the sorbent composition is capable of being regenerated. For example, the composition may be arranged as a regeneratable standalone sorbent bed. The regeneratable bed may be either a packed bed of sorbent composition (of sufficiently large particle size to avoid a significant pressure drop in the fluid being treated), or as a honeycomb form as described herein. The inventors believe that this embodiment may achieve almost 100% capture of heavy metal (eg mercury), even in embodiments in which flue gas desulphurisation (FGD) is not used.

Typically, flue gas streams, which may be treated in accordance with the invention, tend not to flow under high pressures. Therefore, the inventors believe that, in use, a pressure drop may occur in the fluid as it is being treated with the sorbent composition. If the pressure drop experienced in the fluid is too great, back pressure may be created which could affect the combustion process by which the flue gas is created, which would be undesirable. The physical nature of the sorbent composition and/or its arrangement in which the contacting occurs can assist in minimizing this pressure drop. As mentioned herein, the sorbent composition may be in the form of a powder, tablet, pellet, granule, ring, sphere, positioned in a fluidized bed or a packed bed column, formed into a monolith with an inert carrier, form a bag filter coating, form a regeneratable standalone bed, or be used in combination with a selective catalytic reduction (SCR) catalyst. Hence, the specific arrangement of sorbent composition should be chosen depending on whether or not there is a risk that a significant pressure drop could occur when in use.

Preferably, the method of the second aspect comprises feeding the fluid to be treated to the sorbent composition, or vice versa, and allowing the sorbent composition to remove the heavy metal or heavy metal-containing compound from the fluid. The temperature of the fluid stream being treated at the contacting stage is in part affected by upstream processes, such as particulate removal systems (such as the use of cyclones), other contaminant removal systems, or heat exchange systems, etc. However, the inventors have found that the efficiency of the sorbent composition to remove heavy metals and heavy metal-containing compounds from the fluid is dependent on the temperature of the fluid being treated. The fluid is preferably at a temperature of between about 10 and 300° C. during the contacting step, more preferably between about 35 and 250° C., even more preferably between about 50 and 200° C., and most preferably between about 95 and 180° C. Preferably, the fluid to be treated is at a temperature above 75° C., more preferably above 100° C., and most preferably above 125° C. As described in Example 2, the inventors have found that the sorbent composition retains its activity above 150° C., though activity falls with increasing temperature above about 150° C. Therefore, preferably the fluid containing the heavy metal contaminant is at a temperature below about 300° C., more preferably below about 200° C., even more preferably below about 175° C., and most preferably below about 150° C. A most suitable temperature for the sorption is about 150° C.

The method may comprise a step of separating at least some of the sorbent composition from the fluid following sorption of the heavy metal or heavy metal-containing compound. The separation step may comprise use of a filter.

The method may comprise a step of regenerating at least some of the sorbent composition that has captured heavy metal or heavy metal-containing compound. The mercury can be recovered from the sorbent composition during the regeneration step. Regeneration may be achieved by heating the sorbent composition to at least 500° C. for sufficient time (eg at least 4 to 6 hours) such that a proportion of the heavy metals captured by the sorbent composition is released therefrom, thereby regenerating the sorbent composition for treatment of fresh fluid. As described in Example 5, the inventors have surprisingly found that the sorbent composition may be repeatedly regenerated and re-used, and that any decrease in mercury retention of the sorbent composition with repeated cycles of operation was negligible. This indicated that the sorbent composition may be easily regenerated with almost unaffected performance in mercury capture rates.

The inventors have found that the apparatus according to the third aspect is effective for removing heavy metals and heavy metal-containing compounds from the fluid. The means for contacting the sorbent composition with the fluid containing a heavy metal or a heavy metal-containing compound may comprise feed means, which feed means is adapted to feed the fluid to be treated to the sorbent composition, or vice versa. The feed means may comprise a conduit. The sorbent composition may be in particulate form or formed as a monolith.

The apparatus may comprise a vessel in which the sorbent composition may be contained. Hence, the feed means is capable of feeding the fluid to be treated to the vessel. Alternatively, the sorbent composition may be fed into the fluid, for example, by injection.

The apparatus may comprise means for separating at least some of the sorbent composition from the fluid following sorption of the heavy metal or heavy metal-containing compound. The separating means may comprise a filter. The apparatus may comprise means for regenerating at least some of the sorbent composition that has captured heavy metal or heavy metal-containing compound. The regenerating means may comprise an oven.

Suitably, the sorbent composition is capable of removing at least about 70% (w/w) of the heavy metals or heavy metal-containing compounds from the fluid that is treated, more preferably at least about 80% (w/w), and even more preferably at least about 90% (w/w) of the heavy metals or heavy metal-containing compounds from the fluid. Preferably, the sorbent composition is capable of removing at least about 95% (w/w), more preferably at least about 97% (w/w), even more preferably at least about 98% (w/w), and most preferably at least about 99.5% (w/w) of the heavy metals or heavy metal-containing compounds from the fluid.

The skilled technician will appreciate that the extent of heavy metal captured by the sorbent composition may be quantified in terms of its breakthrough capacity, which may be determined using an apparatus as shown in FIG. 1, and the methodology described in the examples. It will be understood that the higher breakthrough capacities correspond to higher rates of heavy metal uptake. Preferably, the sorbent composition is capable of achieving a breakthrough capacity for the heavy metal of greater than 2% (w/w) heavy metal, more preferably greater than 5% (w/w), and even more preferably greater than 10% (w/w) of the heavy metal or heavy metal-containing compound. Preferably, the sorbent composition is capable of achieving a breakthrough capacity for the heavy metal of greater than 15% (w/w), more preferably greater than 20% (w/w), and even more preferably greater than 22% (w/w) of the heavy metal or heavy metal-containing compound.

As previously stated, the co-precipitated manganese oxide and zirconia support material exhibits a high capacity for sorbing heavy metals and heavy metal containing compounds, such as mercury and arsenic. Preferably, the sorbent composition is capable of capturing at least about 1 atom of a heavy metal per every 5 atoms of manganese oxide. More preferably, the ratio of heavy metal atoms captured to manganese atoms is at least about 1:3, more preferably about 1:2, and most preferably about 1:1. The sorbent composition also exhibits the ability to oxidize the elemental heavy metal into a heavy metal-containing compound, such as a heavy metal oxide or chloride. Using mercury as an example, the sorbent composition may therefore oxidize mercury into various oxidized species such as $Hg(1+)$, $Hg(2+)$, or mercury compounds such as $HgO$, $HgCl$, and $HgCl_2$.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying diagrammatic drawings, in which:—

FIG. 1 shows a schematic view of an apparatus used for testing the removal of mercury, Hg(0), from a gas stream using the method according to the present invention. MFC: mass flow controller; LMVG: liquid mercury vapour generator; AFS: atomic fluorescence spectrometer;

FIG. 2 is a graph showing nitrogen sorption isotherms (at 77 K) of $MnO_2$, $ZrO_2$ and MnOx/ZrO2 sorbent;

FIG. 3 is a graph showing the effect of temperature and $SO_2$ on the performance of the $MnO_x/ZrO_2$ sorbent (1:1 atomic ratio);

FIG. 4 is a graph showing thermogravimetric (TG) analysis of the $MnO_x/ZrO_2$ sorbent before (A, dashed) and after (B, solid) Hg uptake of ca. 23% (w/w). The fresh sorbent contains approximately 4% moisture;

FIG. 5 is a graph showing breakthrough capacities for $MnO_x$-based sorbents as a function of composition. Sorbent test conditions: mercury evaporation chamber at 30° C.; test chamber at 35° C.; $N_2$ flow: 80 ml/min; packed sorbent bed: 5 cm×0.5 cm i.d.; dilution factor: 3 (sand/sorbent by volume);

FIG. 6 is a graph showing the effect of temperature, oxygen and $SO_2$ on the performance of the 1:1 $MnO_x/ZrO_2$ sorbent;

FIG. 7 is a graph showing the performance of the 1:1 atomic ratio $MnZrO_y$ sorbent in different operating atmospheres;

FIG. 8 is a graph showing the performance of the $MnZrO_y$ (atomic ratio 1:1) sorbents in mercury retention after repeated mercury uptake/desorption cycles;

FIG. 9 is a graph showing sorbent pellet hardness as a function of pressing weight determined by a MCB Cone Intender;

FIG. 10 is a graph showing sorbent pellet hardness as a function of pressing weight determined by a pharmaceutical tablet hardness tester;

FIG. 11 is a graph showing pellet porosity as a function of pressing weight; and FIG. 12 is a graph showing the effect of pelletizing on nitrogen sorption isotherm of $MnO_x/ZrO_2$, zirconia and pre-cipitated manganese oxide sorbent. The pellet includes 1 g sorbent, 13 mm diameter die 5 to compression weight.

EXAMPLES

The inventors have found that a sorbent composition comprising manganese oxide co-precipitated with a support material, such as zirconia (ie $MnOx/ZrO_2$), may be efficiently used in the removal of heavy metals, such as mercury and/or arsenic, from a gaseous stream. Examples of suitable gaseous streams with which the sorbent composition may be used include natural gas, or the gas streams produced during the combustion or gasification of fossil fuels, such as coal or oil.

Example 1

Preparation of the Mercury Sorbent Composition

The manganese-based mercury sorbent is prepared via co-precipitation of a soluble manganese-containing precursor chemical (eg manganese (II) nitrate) with a soluble zirconium-, cerium- or aluminium-containing precursor chemical (eg aluminium nitrate, zirconium nitrate or zirconium sulphate etc). The following is an example showing how a manganese-based mercury sorbent is prepared using manganese (II) nitrate and zirconium nitrate using a co-precipitation method. The resultant sorbent has a molar ratio of Mn/Zr of 1:1 ($MnO_y:ZrO_2$).

Step 1: The precursor compounds, 28.7 g $Mn(NO_3)_2$ and 33.9 g $ZrO(NO_3)_2$ (Sigma Aldrich), were dissolved in 500 ml distilled water separately under constant stirring conditions at ambient temperature. The volume of distilled water used can be varied from 250 ml to 1000 ml for these quantities of the two precursor compounds. It must be noted that the actual quantities of $Mn(NO_3)_2$ and $ZrO(NO_3)_2$ needed for preparing quantities of sorbent with given Mn/Zr molar ratios are decided by the content of crystal water present in each chemical.

Step 2: The two solutions of precursor compounds were then mixed together to form a solution. Ammonia water, having a density of 0.91 g/cm³, was then slowly added to the solution under constant stirring conditions until its pH value reached about 9 in order to result in the formation of a co-precipitate of the sorbent composition. pH indicator sticks were used to monitor the pH of the solution containing the co-precipitate. Following precipitation, the solution containing the co-precipitate was stirred for 1 hour with addition of sufficient quantities of additional ammonia water, if necessary. The whole solution was then slowly evaporated to dryness at 105° C. in a drying oven. In some embodiments, the mixture including the co-precipitate may be filtered to remove any excessive water before being subjected to drying at 105° C.

Step 3: The dried co-precipitate was then heated at 400° C. in an air-blown oven for 6 hrs, and then activated at 450° C. for another 6 hours to give the final sorbent material. The surface area of the resultant sorbent composition is about 228 m$^2$/g.

Step 4: The resultant sorbent composition was then processed to meet the sorption requirements of different applications. For example, the sorbent composition may be ground up using a pestle and mortar and passed through a 250 µm mesh filter. In use, in order to prevent a significant pressure drop for packed-bed tests described herein, only the 75-250 µm fraction of sorbent composition particles was chosen for the mercury sorption tests using laboratory-based test facilities. For industrial applications, however, it is recommended that the final sorbent is, after grinding, pelletised to different sizes to meet various sorbent requirements, as described in Example 6. Similar preparation procedures as those described above may be used for preparing sorbents comprising other supports, eg alumina, ceria, or combinations thereof.

Example 2

Demonstration of High Mercury Uptake Using the Sorbent

The following example demonstrates the high mercury capture uptake rates that may be achieved using manganese oxide-based sorbents according to the invention in comparison to other commonly used mercury sorbents, such as commercially available activated carbon. The test apparatus used to characterise performance of the sorbent composition is also described. Referring to FIG. 1, there is shown a schematic diagram showing an apparatus for determining mercury sorption capacities by the sorbent of the invention. The apparatus included a mercury generator for producing mercury vapour which was passed to the sorbent composition being tested. The sorbent was exposed to mercury vapour until such time that the sorbent reached its breakthrough capacity, ie when the concentration of the mercury in the outlet reaches 0.1% of the concentration of mercury in the inlet. The concentration of mercury in the outlet was detected by means of an Atomic Fluorescence Spectrometer (AFS). The concentration of mercury captured by the sorbent could then be calculated.

The apparatus included sources of nitrogen, air and sulphur dioxide in nitrogen, the flow of which may be independently controlled by means of mass flow controllers. A liquid mercury (Hg(0)) vapour generator was used to produce mercury vapour which was passed to the sorbent composition being tested. Each sorbent composition being tested was retained within a sorbent tube. The sorbent tube and all of the pipework were maintained at 35° C. throughout each experiment.

Air or nitrogen were bubbled at a flow rate of 80 ml/min through liquid mercury inside the generator at a regulated temperature of 30° C. As a control, wet mercury vapour was generated by reacting Hg(II) and Sn(II)). Due to the high capacities of the manganese oxide (MnO$_x$) sorbents being tested, the mercury concentration in the test gas was kept approximately two orders of magnitude higher than its typical concentration in pulverised fuel (PF) flue gas. For some tests, the sorbent composition was diluted (1:1 or 1:3 by volume) with sand in a packed bed (dimensions of 50 mm long×6 mm diameter), and retained within the sorbent tube.

The efficiency with which the sorbent composition captures mercury was quantified in terms of mercury breakthrough capacity, which will be known to the skilled technician. By the term "breakthrough capacity", we mean the quantity of the heavy metal captured on the sorbent composition, expressed as a percentage (w/w) of the sorbent composition, before appreciable quantities of the heavy metal pass through the sorbent composition without being captured, ie at the point when the outlet concentration of mercury exceeds 0.1% of the inlet concentration of mercury. The apparatus has a mercury detection limit that is equivalent to 0.001 mg/m$^3$. Hence, a rise in the heavy metal detector signal from background (0%) to that of 0.1% of the detector signal at sorbent equilibrium was detectable, and reproducible between tests.

The carrier gas flow containing the mercury was controlled via the very precise mass flow controller (MFC) that bubbles the gas through pure mercury. As the system temperature and pressure are known, the concentration of mercury can also measured by feeding the stream through an Atomic Fluorescence Spectrometer (AFS). When the AFS detector measures >0.1% mercury of the inlet concentration the time of the experiment is recorded, and the weight of mercury that must be captured on the sorbent is then calculated. This weight is divided by the original sorbent weight to provide the breakthrough capacity (%) using the formula: (Weight of mercury when breakthrough is detected)/(weight of sorbent) *100=mercury breakthrough capacity.

Referring to FIG. 2, there are shown a series of nitrogen sorption isotherms (at 77 K) of MnO$_2$ (only), ZrO$_2$ (only) and the co-precipitated MnOy/ZrO$_2$ sorbent composition in accordance with the invention. Nitrogen sorption-desorption isotherms of the sorbents were obtained at 77 K and the surface areas of each sorbent were calculated by the BET method (Brunauer, Emmett, and Teller), known to the skilled technician. The volume of sorbed nitrogen is proportional to the surface area within pores present in each sorbent composition. As shown in FIG. 2, the MnOy/ZrO$_2$ sorbent clearly had the highest surface area of pores, having absorbed significantly higher concentrations of nitrogen than the other sorbents. The shapes of the isotherms indicate that the ZrO$_2$ support and the MnOy/ZrO$_2$ sorbents have the same overall pore structure. It has also been found that increasing the proportion of MnO$_x$ to a 1:1 Mn:Zr atomic ratio results in the surface area of the sorbent approaching a maximum value. The pore structure of the MnO$_2$ obtained by co-precipitation without zirconia is dominated by macropores (ie large pore size), and therefore the surface area remains relatively low. Clearly, the best performance is obtained for the Mn:Zr adsorbents with a 1:1 atomic ratio, which coincides with the highest surface area.

Table 1 below summarizes the performance of mercury capture by manganese oxide-zirconia sorbents compared to a commercially available activated carbon sorbent (Norit-Darco FGD), and also to a bulk sample of manganese oxide that is not co-precipitated with any supporting material (Fischer Chemicals). All sorption tests were conducted in a packed-bed with dimensions of 0.5 cm (internal diameter)×5 cm, and with N$_2$ as the carrier gas at a flow rate of 80 ml/min. The temperature for Hg vapour generation was 30° C., and sand was obtained from BOH 3309476. It should noted that Norit-Darco FGD carbon was diluted with sand at a 1:1 ratio (v/v) to give the same mass of sorbent as for the other sorbents (eg 1:3 (v/v) dilution with sand of the co-precipitated MnOy/ZrO$_2$ sorbent) so that the mercury breakthrough values may be directly compared.

TABLE 1

Hg capture performance of MnOx/ZrO$_2$ adsorbents and a comparison with a commercial active carbon and a bulk sample of manganese oxide

| Sorbent | BET surface area, m$^2$/g | Dilution ratio (Sorbent/sand by volume) | Hg breakthrough capacity, % (w/w) |
|---|---|---|---|
| ZrO$_2$ (75~250 μm) | 127 | 1:0 | <0.002 |
| MnO$_x$/ZrO$_2$ (75~250 μm) | 228 | 1:3 | 17.5 |
| MnO$_x$/ZrO$_2$ (75~250 μm) | 228 | 1:0 | 22.6 |
| Precipitated MnO$_x$ (75~250 μm) | 11 | 1:1 | 2.0 |
| Bulk Manganese oxide* | N.D. | 1:0 | 0.19 |
| Norit-Darco FGD activated carbon (98% <45 μm) | 600 | 1:1 | 0.06 |

*Fischer Chemicals.
N.D. = not determined.

Referring to Table 1, the zirconia support on its own displays negligible mercury (Hg) uptake having an Hg breakthrough capacity of <0.002% (w/w). The undiluted (ie no sand) form of MnO$_x$/ZrO$_2$ sorbent prepared with a 1:1 Mn:Zr atomic ratio achieved an unexpectedly high mercury breakthrough capacity of 22.6% (w/w). When diluted volumetrically at a ratio of sorbent:sand of 1:3 (v/v), the sorbent composition exhibited a mercury breakthrough capacity of 17.5% (w/w). Tests have indicated that the equilibrium capacity of this adsorbent is close to 30% (w/w), which corresponds to an atomic Mn:Hg ratio close to 1:1. Hence, the breakthrough capacity with the 1:3 sand dilution is approximately half the equilibrium capacity under the standard test conditions used.

The Hg breakthrough capacity of 22.6% (w/w) is over 375 times higher than that of commercially available Norit-Darco FGD activated carbon having an Hg capacity of only 0.06% (w/w). The Hg breakthrough capacity of 17.5% (w/w) is nearly 300 times higher than that of the Norit-Darco FGD activated carbon. Norit-Darco FGD carbon has been widely used in direct injection trials for Hg capture from flue gases, and so it will be noted that the co-precipitated MnO$_x$/ZrO$_2$ sorbents according to the invention are clearly superior to this prior art sorbent.

The precipitated MnO$_2$ (MnO$_x$) prepared in the same manner as the co-precipitated MnO$_x$/ZrO$_2$ sorbent but in the absence of the zirconia support was found have a much lower Hg breakthrough capacity of only 2% (w/w), as predicted by its lower surface area. However, this is still higher than for bulk manganese oxide which has a Hg breakthrough capacity of only 0.19% (w/w).

Referring to FIG. 3, there is shown the effect of temperature and sulphur dioxide concentration on the performance of the co-precipitated manganese oxide-zirconia sorbent. Even with 300 ppm SO$_2$ in the gas stream, the effect on Hg uptake is negligible below 150° C., but some reductions do occur at higher temperatures, possibly due to sulphate formation. The investigation into the effect of temperature has shown that the sorption capacity does not fall until temperatures above 150° C. (as shown in FIG. 3). This suggests that the optimum running temperature for the co-precipitated MnO$_x$/ZrO$_2$ sorbent is about 150° C., at which it has an Hg breakthrough capacity of about 17.5% (w/w). However, even at 250° C., the breakthrough capacity is still close to 5% (w/w). Accordingly, in some embodiments, mercury capture can still be achieved at temperatures above 150° C.

Referring to FIG. 4, there are shown thermogravimetric analyses of the sorbent. Thermogravimetric analysis of the sorbent loaded with 22.6% (w/w) Hg shows that significant weight loss generally occurs at temperatures above 300° C., with a T$_{max}$ of around 400° C. (as shown in FIG. 4). Hence, the inventors believe that an optimum running temperature for the sorbent is less than 300° C. The weight loss profile suggests that there is little physically adsorbed Hg on the surface of the MnO$_x$/ZrO$_2$ sorbent, and that mercury is chemically adsorbed on to the sorbent.

These findings indicate the considerable promise of the MnO$_x$-based sorbents prepared by co-precipitation with a support material for Hg capture. These sorbents are much more effective than both bulk and precipitated manganese oxide and, also, supported manganese oxides alone, where the manganese loadings tend to be quite low.

Example 3

Investigation of Using Different Manganese Oxide Supports

The inventors set out to compare the efficacy of support materials other than zirconia in co-precipitated manganese oxide sorbents for capturing mercury. FIG. 5 presents the results obtained with alumina and ceria supports, and combinations of these supports with zirconia (at 1:1 ratios). All of these sorbents were prepared using similar procedures as described hereinbefore, and tested under the same conditions as for the MnZrO$_y$ sorbents described earlier. Compared to the MnO$_x$/ZrO$_2$ with a 1:1 atomic ratio that achieved an exceedingly high mercury breakthrough capacity of 22.6% (w/w) when tested pure, and over 15% (w/w) when diluted volumetrically 1:3 (v/v) with sand, these latest tests indicated that alumina and ceria supports were not as effective as zirconia. For example, MnO$_y$—Al$_2$O$_3$ and MnO$_y$—CeO$_2$ exhibited Hg breakthrough capacities of about 3% (w/w) and 10% (w/w), respectively. Hence, the inventors have found that zirconia behaved as the best support when co-precipitated with manganese oxide. The Hg breakthrough capacities with other support materials (ceria and alumina) were lower than for the MnZrO$_y$ sorbents, but it is worth noting that they are still much higher than for the other sorbent materials as shown in Table 1, and reported elsewhere.

The results also show that the use of combinations of different support materials, eg ZrO$_2$—CeO$_2$ or ZrO$_2$—Al$_2$O$_3$ when co-precipitated with manganese oxide significantly improves the sorbent performance, the former having a breakthrough capacity of 15.5% (w/w) which was comparable to 17.5% (w/w) with ZrO$_2$ only.

Example 4

Tolerance of the Sorbent to Different Atmospheres

To assess the tolerance of the sorbent compositions to different atmospheres, FIG. 6 presents the performances of the 1:1 MnO$_x$/ZrO$_2$ sorbent at high temperatures and in different atmospheres containing varying quantities of SO$_2$ and O$_2$. It can be seen from FIG. 6 that the oxygen supply improves the retention of Hg by the sorbent, but its impact varies with both temperature and the presence of other chemical species. The Hg breakthrough capacity increased by less than 0.5% (w/w) in the presence of 5% (v/v) O$_2$ and in the absence of SO$_2$ at 250° C. and 350° C. In contrast, in the presence of 300 ppm SO$_2$, the same level of external O$_2$ supply led to an increase of 1.5% (w/w) breakthrough capacity at 250° C., and nearly 2% (w/w) at 350° C.

At both temperatures, a further increase of O$_2$ supply from 5 to 10% (v/v) yielded no significant further improvement in Hg capture, and generally less than 0.5% (w/w). Therefore, the inventors believe that the performance of the MnZrO$_y$ sorbent can be potentially improved when it is used to remove mercury from combustion flue gas often containing varying levels of oxygen and sulphur dioxide.

In order to highlight the extraordinary performance of the sorbent, the inventors carried out an experiment to determine if the sorbent composition acts as a catalyst and/or a physical absorbent/adsorbent. Initially, the sorbent was fully loaded with mercury (under an atmosphere of nitrogen gas) until it was physically saturated. The inventors wanted to evaluate whether the mercury sorbent worked in the presence of a reducing (H$_2$) atmosphere and a poisonous gas (HgS) at ambient temperatures. Hence, mercury was then introduced to the sorbent in hydrogen gas (H$_2$/0.5% H$_2$S (v/v)). FIG. 7 presents the results obtained with H$_2$/0.5% H$_2$S (v/v) for a batch of the sorbent, which had already been subjected to a breakthrough test. It shows that, even when the sorbent was already physically saturated and had already achieved an equilibrium capacity of 25.3% (w/w) mercury in the presence of a nitrogen atmosphere, it could still act as a catalyst converting the elemental mercury to HgS (solid), which removed the mercury from the gas stream.

Hence, the inventors believe that the sorbent acts as a catalyst in the H$_2$/H$_2$S environment, because in the absence of the sorbent, the mercury and H$_2$S would not normally react to form solid HgS. The reasons for the catalytic effect are not understood. However, the benefit of this surprising catalytic activity is that the solid HgS is effectively captured on to the sorbent. Hence, the inventors have clearly demonstrated that the composition also functions as a sorbent in the atmosphere of H$_2$/H$_2$S.

Example 5

Regeneration of the Sorbent

To assess the regenerability of the sorbents, the MnO$_x$/ZrO$_2$ sorbent with a 1:1 atomic ratio was subjected to repeated mercury uptake/desorption cycles. The mercury uptake tests were conducted under the same conditions as for a standard breakthrough test, including the same temperature (ambient), sand dilution ratio (sand/sorbent 3:1 by volume) and the same packed volume. Once a breakthrough was achieved each time, the whole packed sorbent tube including the sorbent was then heated for 6 hours at a temperature of 500° C. in an oven with a continuous flow of air in order to release the sorbed mercury from, and thereby regenerate, the sorbent. Following regeneration, the sorbent was re-used for the next breakthrough test.

FIG. 8 presents the results from these regeneration tests, and it can be seen that the Hg breakthrough capacity for fresh sorbent was 17.5% (w/w), but this decreased marginally to 16.3% (w/w) for the regenerated adsorbent from the first adsorption/desorption cycle, but it was increased to 17.0% (w/w) for the regenerated adsorbent from the second cycle. Overall, the change of the mercury retention of the adsorbent with repeated cycles of operation was negligible, indicating that the adsorbent can be easily regenerated with almost unaffected performance in Hg capture. Furthermore, the mercury can be recovered as the adsorbent is regenerated.

Example 6

Pelletisation of the Sorbent Composition

Pellets having a diameter of 13 mm were formed using a 13 mm die using about 1 g of the sorbent of the invention at a temperature of 450° C. Furthermore, in some embodiments, inorganic binders (such as bentonite) can be used to improve the pellet strength and macroporous structure of the sorbent composition. The strengths of the pellets (using a MCB Cone Intender and a pharmaceutical tablet hardness tester) were then determined as a function of the pressing weight applied to the pellets (Cone Intender: New device for measuring rock strength, Mining and Minerals Eng. March. 1959 p. 53). The results are shown in FIGS. 9 and 10. As shown in FIG. 9, during the Cone Intender test, the 1 tonne pellet broke, whereas the 2 tonne pellet did not break.

The inventors investigated the porosity of the pellets as a function of compression weight on a 13 mm diameter pellet. Two techniques were used to determine porosity, ie by Helium density tests, and by the water penetration method (He Pycnometry: A Micromeritics instrument was used and the method is written in a Micromeritics publication: Paul A. Webb: Volume and Density Determinations for Particle Technologists. Micromeritics Publication. Micromeritics Instrument Corp. Feb. 16, 2001 (2001)). The determination of porosity by a simple water saturation method involves measuring the interconnected porosity of pellets excluding the residual porosity (Marja Siitari-Kauppi: Development of 14 C Polymetacrilate method for characterisation of low porosity media. Application to rocks in geological barriers of nuclear waste storage. Academic dissertation. Report Series in Radiochemistry 17/2002, Helsinki (2002)). Porosity (ø) is defined as the ratio of volume of void space ($V_P$) to bulk volume of the material ($V_T$), including the solid and void components, or as a percentage by multiplying the fraction by 100.

The results are shown in FIG. 11. As can be seen, the porosity of the pellets decreases as a function of the applied compression. Hence, it is believed that the pressing weight must be kept as low as the pellet hardness will allow. In order to avoid a decrease in the amount of macropores in the sorbent, which would have a negative effect on Hg capture rate, the inventors recommend that a maximum of 2 tonnes is used for a 13 mm diameter pellet.

Referring to FIG. 12, there is shown a comparison of the volume of sorbed nitrogen by the sorbent (corresponding to sorbent porosity) between the powder form of co-precipitated manganese oxide on a zirconia support and the pelletised form of co-precipitated manganese oxide on a zirconia support. Surprisingly, the degree of porosity is almost identical between the two forms of sorbent. As shown, there is only a relatively small effect of compression on the pore structure in that the pellet-form. This is especially advantageous for industrial applications of the sorbent in which pellets tend to be used.

Example 7

Use of the Sorbent to Remove Heavy Metals from Gas Streams Produced During the Combustion of Fossil Fuels The inventors have devised an apparatus and method for removing heavy metals from gas streams produced during the combustion (or gasification) of fossil fuels. For the industrial implementation of the sorbent to treat gas streams containing metallic mercury, and mercury- and arsenic-containing compounds, it is envisaged that a packed-bed will be used containing at least 10 kg of the manganese oxide-based sorbent co-precipitated with zirconia according to the invention in pellet-form. The size of the pellets of the sorbent would be selected to give a minimum pressure drop across the bed dependent on the flow rate of the gas stream being treated. Hence, these pellets would ideally have a diameter larger than 3 mm. The volume of the sorbent bed is about 10 litres, and the bed is about 1 m in length. The running conditions are selected to give an operating life of least 10 years, depending upon the mercury and arsenic content in the gas stream being treated.

Once the apparatus has been set up, the flue gas produced during the combustion of a fossil fuel (eg methane) is then passed via a conduit through the packed bed, and over the pellets of sorbent. The process is run at a temperature of about 150° C. The inventors have shown that the sorbent captures a significant amount of mercury and arsenic as well as mercury/arsenic-containing compounds in the gas stream.

In cases where the flue gas being treated contains high concentrations of mercury or arsenic, it may be necessary to regenerate the sorbent composition. Hence, the process is stopped, and the bed of sorbent is removed from the apparatus. The pellets are filtered out of the bed, and then regenerated. The sorbent may be easily regenerated for subsequent use by heating the pellets in an oven at 500° C. for at least four hours. The regenerated pellets may then be replaced back into the packed bed and the process initiated by passing the flue gas therethrough. Hence, the inventors of the present invention believe that particles or monolithic forms of the sorbent composition may be effectively used due to the possibility that that they may be regenerated and used repeatedly.

The invention claimed is:

1. A method of removing a heavy metal or a heavy metal-containing compound from a fluid, the method comprising contacting a fluid containing a heavy metal or heavy metal-containing compound, with a sorbent composition consisting essentially of manganese oxide co-precipitated with or on a support material, under conditions suitable to remove the heavy metal or heavy metal-containing compound from the fluid, wherein the sorbent composition comprises between about 50% and 80% (w/w) support material.

2. Method according to claim 1, wherein the sorbent composition comprises manganese (III) oxide and/or manganese (IV) oxide.

3. Method according to claim 1, wherein the support material comprises a refractory metal.

4. Method according to claim 1, wherein the support material comprises a metal oxide.

5. Method according to claim 1, wherein the support material is selected from a group of support materials consisting of ceria ($CeO_2$), alumina ($Al_2O_3$), titania ($TiO_2$), silica ($SiO_2$), chromia ($CrO_2$), and zirconia ($ZrO_2$), and mixtures thereof.

6. Method according to claim 5, wherein the support material co-precipitated with the manganese oxide is zirconia ($ZrO_2$).

7. Method according to claim 1, wherein the sorbent composition comprises manganese oxide co-precipitated with a mixture of at least two different support materials.

8. Method according to claim 7, wherein the mixture of co-precipitated support materials comprises ceria ($CeO_2$) combined with zirconia ($ZrO_2$), or zirconia ($ZrO_2$) combined with alumina ($Al_2O_3$), or titania ($TiO_2$) combined with silica ($SiO_2$) or chromia ($CrO_2$).

9. Method according to claim 1, wherein the heavy metal or heavy metal-containing compound that is removed from the fluid by the sorbent composition is selected from a group of heavy metals consisting of arsenic, beryllium, lead, cadmium, chromium, nickel, zinc, mercury, and barium.

10. Method according to claim 1, wherein the heavy metal that is removed from the fluid is mercury (Hg) or arsenic (As).

11. Method according to claim 1, wherein the heavy metal is mercury.

12. Method according to claim 1, wherein the sorbent composition is prepared by co-precipitation of a manganese-containing compound and a zirconium-containing compound.

13. Method according to claim 12, wherein the manganese-containing compound is a manganese oxide precursor, and the zirconium-containing compound is a zirconium oxide precursor.

14. Method according to claim 13, wherein the manganese oxide precursor is manganese nitrate, manganese acetate, manganese dichloride or manganese dibromide.

15. Method according to claim 14, wherein the manganese oxide precursor is manganese nitrate.

16. Method according to claim 13, wherein the zirconium oxide precursor is zirconium nitrate, zirconium acetate, zirconium oxychloride, or zirconium oxysulfate.

17. Method according to claim 16, wherein the zirconium oxide precursor is zirconium nitrate.

18. Method according to claim 1, wherein the sorbent composition comprises an atomic ratio of manganese to metal atoms in the support material of about 1:1.

19. Method according to claim 1, wherein the sorbent composition is employed in particulate form.

20. Method according to claim 19, wherein the sorbent composition has a mean particle size of between about 1 μm and 20 mm.

21. Method according to claim 19, wherein the sorbent composition has a mean particle size of between about 30 μm and 5 mm.

22. Method according to claim 19, wherein the sorbent composition comprises a binder material.

23. Method according to claim 22, wherein the binder material is clay or bentonite.

24. Method according to claim 1, wherein the sorbent composition is combined with an inert solid carrier to produce a monolithic structure.

25. Method according to claim 24, wherein the inert carrier is a refractory material able to withstand high temperatures.

26. Method according to claim 25, wherein the refractory material is a ceramic or metallic material.

27. Method according to claim 1, wherein the sorbent composition is positioned in a fluidized bed, placed in a packed bed column, incorporated into a foam, or used to coat a bag filter.

28. Method according to claim 1, wherein the sorbent composition is used in combination with, or incorporated in, a selective catalytic reduction (SCR) catalyst.

29. Method according to claim 1, wherein the sorbent composition is capable of being regenerated.

30. Method according to claim 1, wherein the surface area of the sorbent composition is at least 200 $m^2/g$.

31. Method according to claim 1, wherein the sorbent composition has a pore volume which is between about 1 and 2 $cm^3/g$.

32. Method according to claim 1, wherein the sorbent composition is capable of achieving a breakthrough capacity for the heavy metal of greater than 2% (w/w) heavy metal.

33. Method according to claim 1, wherein the sorbent composition is capable of achieving a breakthrough capacity for the heavy metal of greater than 10% (w/w) heavy metal.

34. Method according to claim 1, wherein the fluid being treated is a gas.

35. Method according to claim 1, wherein the fluid being treated is a natural gas stream, or a gas stream produced during the combustion or gasification of a fossil fuel.

36. Method according to claim 1, wherein the fluid being treated is at a temperature of between about 50 and 200° C.

37. Method according to claim 1, wherein the method comprises feeding the fluid to be treated to the sorbent composition, or vice versa, and allowing the sorbent composition to remove the heavy metal or heavy metal-containing compound from the fluid.

38. Method according to claim 36, wherein the fluid is at a temperature of between about 95 and 180° C.

39. Method according to claim 1, wherein the method comprises a step of separating at least some of the sorbent composition from the fluid following capture of the heavy metal or heavy metal-containing compound.

40. Method according to claim 1, wherein the method comprises a step of regenerating at least some of the sorbent composition that has captured heavy metal or heavy metal-containing compound such that a proportion of the heavy metal captured by the sorbent composition is released therefrom, thereby regenerating the sorbent composition for treatment of fresh fluid.

41. Method according to claim 40, wherein the step of regenerating comprises heating the sorbent composition to at least 500° C.

42. A heavy metal removal apparatus for removing a heavy metal or a heavy metal-containing compound from a fluid, the apparatus comprising a sorbent composition consisting essentially of manganese oxide co-precipitated with or on a support material, and means for contacting the sorbent composition with a fluid containing a heavy metal or a heavy metal-containing compound, wherein the sorbent composition is capable, in use, of removing the heavy metal or heavy metal-containing compound from the fluid, wherein the sorbent composition comprises between about 50% and 80% (w/w) support material.

43. An apparatus according to claim 42, wherein the apparatus comprises a vessel in which the sorbent composition is contained.

44. An apparatus according to claim 42, wherein the means for contacting the sorbent composition with the fluid containing a heavy metal or a heavy metal-containing compound comprises feed means, which feed means is adapted to feed the fluid to be treated to the sorbent composition, or vice versa.

45. An apparatus according to claim 44, wherein the feed means comprises a conduit.

46. An apparatus according to claim 42, wherein the apparatus comprises means for separating at least some of the sorbent composition from the fluid following sorption of the heavy metal or heavy metal-containing compound.

47. An apparatus according to claim 46, wherein the separating means comprises a filter.

48. An apparatus according to claim 46, wherein the apparatus comprises means for regenerating at least some of the sorbent composition that has sorbed heavy metal or heavy metal-containing compound.

49. Method according to claim 26, wherein the ceramic material is sillimanite, petalite, cordierite, mullite, zircon, zircon mullite, spodumene, or alumina-titanate.

50. Method according to claim 35, wherein the fossil fuel is coal, petroleum, or oil.

51. Method according to claim 1, wherein the sorbent composition consists of manganese oxide co-precipitated with or on a support material.

52. An apparatus according to claim 42, wherein the sorbent composition consists of manganese oxide co-precipitated with or on a support material.

\* \* \* \* \*